United States Statutory Invention Registration [19]

[11] Reg. Number: H429

Harris et al. [43] Published: Feb. 2, 1988

[54] LOW TEMPERATURE SYNTHESIS OF METAL SULFIDES

[75] Inventors: Daniel C. Harris; Robert W. Schwartz; Curtis E. Johnson, all of Ridgecrest, Calif.

[73] Assignee: The United States of America as represented by the Secretary of the Navy, Washington, D.C.

[21] Appl. No.: 42,089

[22] Filed: Apr. 13, 1987

[51] Int. Cl.[4] ..... C01F 5/00; C01F 7/70; C01G 9/08; C01G 11/02

[52] U.S. Cl. ..... 423/561 R; 423/561 B

[56] References Cited

U.S. PATENT DOCUMENTS

| | | | |
|---|---|---|---|
| 3,084,189 | 4/1963 | Chang | 260/534 |
| 3,576,765 | 4/1971 | Vallet | 252/439 |
| 4,142,875 | 3/1979 | Bohmholdt | 55/72 |
| 4,461,750 | 7/1984 | Chess | 423/263 |

OTHER PUBLICATIONS

Yamamoto, T.; Taniguchi, A. *AnS Doped by Electron Donating Organic Ligant (L=bpy, phen, py) and Control of Semiconducting Properties of ZnS by the Ligand* Inorg. Chem. Acta, vol. 97, pp. 111-113-1985.

Manasevit, H. M.; Simpson, W. I., *The Use of Metal-Organic in the Preparation of Semiconductor Materials.* Solid State Science, vol. 118, pp. 644-647—Apr. 1971.

*Primary Examiner*—John F. Terapane
*Assistant Examiner*—Eric Jorgensen
*Attorney, Agent, or Firm*—William C. Townsend; W. Thom Skeer; Stephen J. Church

[57] ABSTRACT

Finely divided metal sulfide powders of uniform size are produced at low temperatures by a method of adding solutions of organometallic compounds to an organic solvent saturated with $H_2S$. The solvent is kept saturated with $H_2S$ by adding $H_2S$ at a rate greater than that for the organometallic compound.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW TEMPERATURE SYNTHESIS OF METAL SULFIDES

BACKGROUND OF THE INVENTION

1. Field of the Invention

This invention is related to metal sulfide powders useful as precursors for optical ceramics and catalysts. More particularly, this invention is related to a low temperature synthesis of metal sulfide powders by reaction between an organometallic compound and hydrogen sulfide.

2. Description of the Prior Art

Metal sulfide powders are useful as precursors for optical ceramics used in sensor windows and domes on aircraft, satellites, and missiles. Precursors having high purity and small. uniform particles are necessary to provide optical ceramics having excellent thermal, mechanical and optical properties. Additionally, metal sulfide powders are useful as catalysts because they contain small, uniform particles having a large surface area.

Conventional methods of synthesizing metal sulfide powders require high temperatures and inorganic starting materials. High temperatures promote particle growth which detracts from the optical and thermomechanical properties of the ceramic. Inorganic starting materials contain undesirable impurities which can degrade the performance of the optical ceramic or catalyst.

Organometallic compounds are known to be useful in the preparation of some metal chalcogenides. For example, the gas phase reaction between an organometallic compound such as diethyl zinc with hydrogen sulfide, hydrogen selenide or dimethyltellurium has.been reported. The reaction is run at temperatures of 750° C. or greater and has been used to prepare the sulfides, selenides and tellurides of zinc and cadmium.

The liquid phase reaction of diethyl zinc with hydrogen sulfide has been reported. This room temperature reaction has been used to prepare zinc sulfide containing ligands such as 2,2'-bipyridine, 1,10-phenanthroline, and pyridine. The procedure involves an $H_2S$ purge of an anhydrous ethereal solution of diethyl zinc and an organic ligand. The procedure has been adapted to produce zinc sulfide without the ligand. However, the particle size of the resulting zinc sulfide was not reported.

Optical ceramic precursors having small particles are desirable because they often can be processed under mild conditions into fine-grained ceramics. The resulting fine-grained ceramics are generally low in defects and have improved optical and mechanical properties. Moreover, if the grain size is substantially smaller than the wavelength of light, then light scattering between grains in non-cubic materials is minimized. As a result, a wider range of metal sulfides would be available as optical ceramics.

Metal sulfide powders used as optical ceramic and catalyst precursors must have few impurities. The purity of the final product is dependent on the purity of the starting material. Inorganic starting materials used in conventional syntheses contain impurities which can degrade the performance of the ceramic. Organometallic starting materials of very high purity are easily obtained by distillation, sublimation or recrystallization. However, the purity of the final product may be affected by the presence of residual hydrocarbon in the form of incompletely reacted organometallic material or entrained solvent.

SUMMARY OF THE INVENTION

Aocording to the present invention finely divided metal sulfide powders of uniform size are produced by adding a solution of an organometallic compound at a predetermined rate to an organic solvent saturated with $H_2S$. The reaction can be performed at temperatures in the range of −78° C. to 100° C. The reaction solution is kept saturated with $H_2S$ by adding $H_2S$ at a rate greater than that for the organometallic compound.

An object of this invention is to provide a low temperature synthesis of metal sulfides that may be used as precursors to optical ceramics or catalysts.

Another object of this invention is a method of producing high purity metal sulfide powders containing small, uniform particles having a large surface area.

Other objects, advantages and novel features of the invention will become apparent from the following detailed description.

DETAILED DESCRIPTION OF THE INVENTION

The present invention provides a synthesis of metal sulfide powders by reaction of an organometallic compound in solution with hydrogen sulfide ($H_2S$) at temperatures from about −78° C. to about 100° C. Organometallio reagents are particularly suitable for the low temperature preparation of metal sulfide powders which are desired as precursors to 8–12 micrometer infrared-transmitting ceramics.

The use of organometallic reagents in the low temperature synthesis of ceramic powders offers many advantages over conventional preparations. Organometallic reagents can be obtained in high purity and can be mixed at a molecular level while in solution. Bimetallic complexes may also be useful for making ternary materials. Additionally, the low temperatures possible with organometallic oompounds in solution are a factor in promoting small and uniformly sized particles which are suitable for processing under mild conditions into fine-grained ceramics.

Metal sulfide powders have been prepared by reacting $H_2S$ with dimethylzinc, di(tertiary-butyl)zinc, triethylaluminum, trimethylaluminum, diethylmagnesium, and bis(trimethylsilylmethyl)cadmium. Other reagents besides metal alkyl compounds may be useful, such as metal alkoxides, thioalkoxides and hydrides.

The reaction of organometallic compounds in solution with hydrogen sulfide produces a fine precipitate immediately upon mixing. The major impurity in the resulting metal sulfide powder is residual hydrocarbon which reduces the transparency of optical ceramic materials upon densification.

Residual hydrocarbon usually results from incomplete reaction of the organometallic reagent or from residual organic solvent. The amount of residual hydrocarbon due to unreacted zinc-alkyl groups parallels the order of stability of the zinc-alkyl compounds. For example, dimethylzinc is more stable than diethylzinc, which in turn, is more stable than di(t-butyl)zinc. Zinc sulfide powders made from dimethyl zinc contain more unreacted metal alkyl reagent and, consequently, more residual hydrocarbon than powders made from diethylzinc or di(t-butyl)zinc.

Additionally, certain solvents such as diethyl ether are difficult to completely separate from the metal sulfide powders and may also significantly increase the amount of residual hydrocarbon. Solvents which are easily separated from the metal sulfide powders include toluene and heptane.

The method of adding reagents significantly affects the purity of the resulting metal sulfide powder. A $H_2S$ purge of an organometallic compound in solution results in significantly higher levels of residual hydrocarbon than procedures involving the addition of an organometallic reagent in solution to an organic solvent that is saturated with $H_2S$. For example, the $H_2S$ purge of a diethylzinc/heptane solution at 25° C. resulted in a residual zinc-ethyl group level of 30,000 ethane/mole zinc) as measured by acid hydrolysis in which the liberated hydrocarbon is measured using gas chromatography. In contrast, adding a diethylzinc/toluene solution to toluene saturated with $H_2S$ at −20° C. resulted in a residual zinc-ethyl group level of about 10 ppm.

Temperature is also important in preparing small, uniform particles. In the range of temperatures used for the reaction, low temperatures result in smaller particle sizes. One possible explanation may be a larger number of nucleation sites at lower temperature, due to slower diffusion of reactants. Additionally, low temperatures increase the solubility of $H_2S$ in the organic solvent. As a result, increased amounts of $H_2S$ in the solvent are believed to cause more complete reaction of the organometallic reagents leading to less unreacted organometallic compounds. Zinc sulfide has been formed according to the present invention at temperatures ranging from −78° C. to 100° C. Temperatures from −78° C. to about −100° C. may also be favorable for the reaction. Temperatures in the range from −78° C. to about −20° C. have been found to give the best results. At temperatures near the boiling point of $H_2S$, a 1 Molar solution of $H_2S$ in the organic solvent is preferred.

The rate at which the organometallic compound in solution is added to the $H_2S$-saturated solvent affects the level of organic residue in the metal sulfide powder. A dilute solution of the organometallic compound added at a constant rate from about 0.01 moles/hour to about 1 mole hour has been found to be suitable for a reaction on the 0.1 mole scale. The preferred rate of addition is about 0.1 mole/hour for a reaction on the 0.1 mole scale. It is also important to maintain $H_2S$ saturation of the organic solvent during addition of the organometallic compound. This is accomplished by bubbling $H_2S$ through the organic solvent at a rate slightly greater than the rate which the organometallic compound is added.

The following example is given to illustrate but not limit the invention:

EXAMPLE

Synthesis of ZnS

Diethylzinc was distilled and stored in a helium-filled glovebox. Toluene and pentane were distilled from sodium and stored under argon. $H_2S$ was used as received.

Approximately 15.2 g (0.123 mole) of diethyl zinc was added to a dry flask under an argon atmosphere. About 90 ml of toluene was added to a reaction vessel which was then cooled and maintained at a temperature of −20° C. to −25° C. The toluene in the reaction vessel was saturated with $H_2S$ by bubbling the gas through the solvent.

The diethylzinc was diluted to 1 mole per liter with 110 mL of toluene and stirred briefly to ensure homogeneity. With rapid $H_2S$ flow through the $H_2S$-saturated solvent and rapid stirring with a magnetic stirbar in the reaction vessel, the diethylzinc solution was added to the toluene solution via a 22 gauge cannula over a period of about 1 hour. After the addition of the diethylzinc, the $H_2S$ flow was continued for 1 minute. The reaction vessel was allowed to warm to room temperature and the excess $H_2S$ was allowed to escape.

The zinc sulfide powder was collected by filtration under an argon atmosphere and washed with two 30 mL portions of toluene and three 20 mL portions of pentane. The solid was pumped dry for 20 minutes and then transferred to a glovebox. The solid was dried under a vacuum of less than 0.01 torr at 25° C. for one hour then heated and maintained at 100° C. for 24 hours.

Electron micrographs of the solid show spherical particles with diameters ranging from 20 to 100 nanometers. Acid hydrolysis of the solid shows a level of zinc-ethyl group impurity of approximately 10 ppm.

Modifications and variations of the present invention are possible. It should be understood that, within the scope of the appended claims, the invention may be practiced otherwise than as specifically described.

What is claimed is:

1. A low temperature method of producing metal sulfide powders with small, uniform size and a large surface area by reaction between an organometallic compound and hydrogen sulfide comprising the steps of:

saturating an organic solvent with $H_2S$;

adding a solution of an organometallic compound and organic solvent to said $H_2S$ saturated solution;

maintaining $H_2S$ saturation of said reaction mixture by adding $H_2S$ at a greater rate than the organometallic compound;

recovering a pure, finely divided powder; and drying said powder by heating while under a vacuum.

2. The method of claim 1 wherein said organometallic compound is selected from the group consisting of triethylaluminum, trimethylaluminum, diethylmagnesium, and bis(trimethlsilylmethyl) cadmium.

3. The method of claim 1 wherein said organic solvent is selected from the group consisting of toluene and heptane.

4. The method of claim 1 wherein said saturated solution of an organic solvent and $H_2S$ is maintained at a temperature within the range from about 100° C. to about −40° C.

5. The method of claim 1 wherein said solution of an organic solvent and $H_2S$ is maintained at a temperature within the range from about −40° C. to about −100° C. and at a $H_2S$ concentration of about 1 mole per liter.

6. The method of claim 1 wherein said organometallic compound is added to said $H_2S$ saturated solution at a rate within the range from about 0.01 moles/hour to about 1 mole/hour for a reaction on the 0.1 mole scale.

7. The method of claim 1 wherein said finely divided powder is recovered by filtration and washing.

8. The method of claim 1 wherein said powder is dried by heating under a vacuum of less than 0.01 torr to 100° C. for about 24 hours.

9. A low temperature method of producing zinc sulfide particles with diameters of about 20 to 100 nanometers and a large surface area by reaction between diethyl zinc and hydrogen sulfide comprising the following steps:

maintaining a solution of toluene and $H_2S$ at a temperature within the range from about 100° C. to about −40° C.;

saturating said solution of toluene with $H_2S$;

adding a solution of diethyl zinc and toluene to said $H_2S$ saturated toluene solution at a rate within the range from about 0.01 moles/hour to about 1 mole/hour for a reaction on the 0.1 mole scale;

maintaining $H_2S$ saturation of said reaction mixture by adding $H_2S$ at a greater rate than diethyl zinc;

recovering a pure, finely divided powder; and drying said powder by heating while under a vacuum of less than 0.01 torr.

10. The method of claim 9 wherein said solution of an organic solvent and $H_2S$ is maintained at a temperature within the range from about −40° C. to about −100° C. and at a $H_2S$ concentration of about 1 mole per liter.

* * * * *